UNITED STATES PATENT OFFICE.

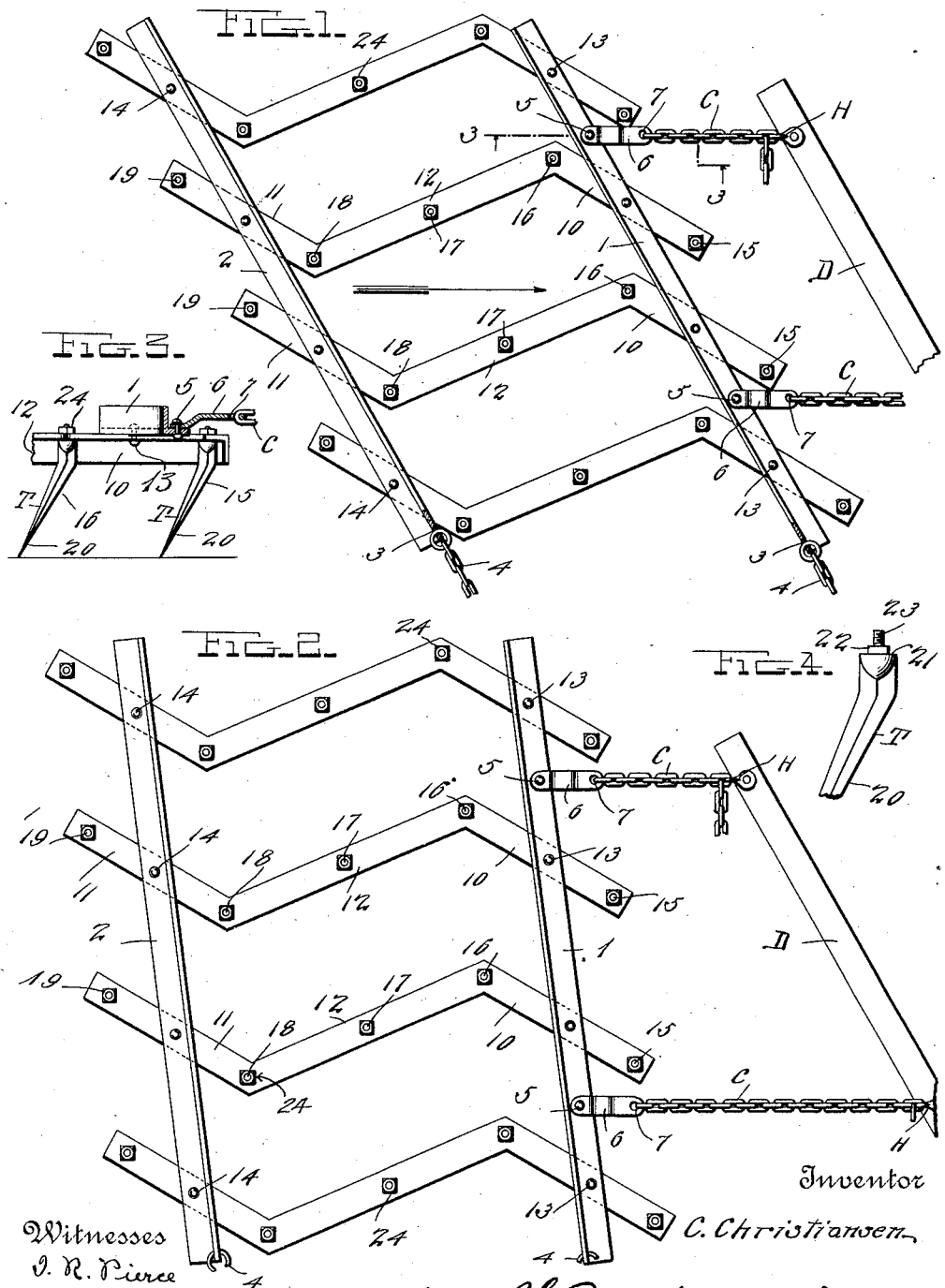

CHRISTIAN CHRISTIANSEN, OF KENMARE, NORTH DAKOTA.

HARROW.

1,063,774. Specification of Letters Patent. Patented June 3, 1913.

Application filed May 29, 1912. Serial No. 700,464.

*To all whom it may concern:*

Be it known that I, CHRISTIAN CHRISTIANSEN, a citizen of the United States, residing at Kenmare, in the county of Ward and State of North Dakota, have invented certain new and useful Improvements in Harrows; and I do declare the following to be a full, clear, and exact description of the invention, such as will enable others skilled in the art to which it appertains to make and use the same.

This invention relates to harrows, and more particularly to those whose form is changeable; and the object of the same is to produce a harrow whose frame is truly flexible so that it accommodates itself to the irregularities of the earth and to changes in the line of draft, and whose teeth are so disposed that they can not follow each other. These objects are accomplished by constructing the harrow in the manner set forth in the following specification and claims, and shown in the drawings wherein—

Figure 1 is a plan view of one section of this improved harrow, and Fig. 2 a similar plan after one of the chains has been lengthened so that the teeth of the harrow travel along somewhat different lines; Fig. 3 is a vertical section on the line 3—3 of Fig. 1, and Fig. 4 is an enlarged perspective detail of one of the teeth.

In the drawings I have used the letter D to designate a drag bar having hooks H, although this member might not stand oblique to the line of draft indicated by the arrow, as the hooks could be disposed on a member of different shape or in fact it might be replaced by other devices to which the chains C are detachably and adjustably connected. The harrow in the present instance is shown as composed of a plurality of sections connected with each other end to end, and the number of these sections is immaterial, and in fact one section alone may be employed.

Each section of my improved harrow is by preference constructed so as to include a front bar 1 and a rear bar 2, by preference being made of angle iron as shown and standing parallel with each other and oblique to the line of draft, and both also by preference having eyes 3 near their extremities by means of which this section can be attached to another adjacent section, as by short sections or lengths of chain 4 or otherwise. To the front bar 1 are pivoted at 5, 5 two short links 6 upbent near their front ends and pierced with eyes 7 into which the chains C are engaged. I have shown said chains as engaging over the hooks H on the drag bar D, although it is obvious that they might fixedly engage said drag bar and adjustably engage the links, the idea being that some connection between the harrow section and the drawing device D such as will permit of the independent adjustment in the length of the two connections is necessary in order to carry out my invention, as will be seen below. The pivots 5 between the links 6 and the front bar 1 may be bolts or rivets extending downward through the horizontal leaf of said bar 1 if the latter be of L-iron, and by preference its upright leaf stands in rear of said rivets or bolts so that the links may swing freely from side to side. Their front ends are upbent in order to clear the heads of the threaded shanks and the nuts thereon, both forming part of the teeth described below.

Next below the two bars 1 and 2 are the tooth bars which are alike and strictly parallel, and each of which may be said to be made "zig-zag" in plan view. That is to say, the front arm 10 and the rear arm 11 are parallel with each other but out of alinement, and an oblique arm 12 connects the rear end of the front arm and the front end of the rear arm. These bars may also be made of L-iron, T-iron or strap iron, but their flat leaves should be uppermost next the under side of the cross bars 1 and 2. To the latter they are pivoted as at 13 and 14 by bolts, rivets or otherwise, the pivots passing through the centers of the front and rear arms. Finally each tooth bar carries five teeth T, one at the front end of the front arm as indicated at 15, three through the intermediate arm as indicated at 16, 17 and 18, and a fifth tooth at 19 at the rear end of the rear arm—all the front teeth on the several arms being in front of the forward cross bar, and all the rear teeth on the rearward arms being in rear of the rearmost cross bar. The teeth T are of a shape best seen in Fig. 4, and each comprises a point 20 having a shoulder 21 near its upper end above which it is reduced and squared as at 22, and above that in turn is reduced and threaded as at 23; and a nut 24 engages a threaded end. The squared portion is passed upward through a similar hole in the tooth bar, and the nut run down upon the threaded upper end until it is in contact with the upper face of said bar, or a washer thereon. The inclination of the tooth point is to the rear along the line of draft.

In use this improved harrow is hitched behind the drag bar D or whatever member is to act in that capacity, in any suitable way as by the chains C illustrated; and when draft is applied the links 6 will follow the chains along the line of draft as is obvious, the pivotal points 5 between the links and the front cross bar will also follow the draft points (here shown as the hooks H), and the entire harrow section will therefore travel along the line indicated by the arrow in Fig. 1. This causes the front cross bar 1 to push the foremost teeth forward of it and to drag the second transverse row of teeth in rear of it, and as one set of teeth stands to one side of the pivots 13 and the other set to the other side thereof the resistance of the earth against the front set will be overcome by the resistance against the rear set. Theoretically the same takes place with the sets of teeth in front and in rear of the rearmost cross bar. Finally the intermediate teeth 17 which are directly in rear of the forward pivots 13 which latter of course are moving along the line of draft, apply their resistance directly to the rear. The result is that—while this entire harrow section as a whole may flex when obstructions are encountered by any one or more of the teeth—ordinarily it follows the line of draft with its members disposed as in Fig. 1 of the drawings, unless one or the other of the chains C or other fastening devices is lengthened, when the parts assume different angles to each other as seen in Fig. 2 of the drawings. However, even when the zig zag tooth-bars turn on their pivots 13 and 14, the links 6 also turn on their pivots, and the rule given above stands good for the parts in their new or adjusted positions.

Thus it will be seen that I have met a long-felt want by producing a flexible harrow which, while it may flex to avoid obstructions and will be flexed when the attachments are altered so that the angle of the cross bars to the line of draft is changed, will nevertheless need no braces, fastenings, or other devices to hold its tooth bars in proper relative position to its cross bars; and one in which, no matter what the adjustments, the teeth on any one tooth bar do not follow each other.

It will not be necessary for the purposes of this specification to amplify the details further or to give the sizes proportions and materials of parts.

What is claimed as new is:—

1. The herein described harrow comprising a pair of cross bars, a pair of links connected with the forward bar and to which the draft appliances are attached, a set of tooth bars parallel with each other and zig zag in plan view, pivots between each tooth bar and the cross bars, and teeth carried by said tooth bars.

2. The herein described harrow comprising cross bars, a pair of links pivotally connected therewith and to which the draft appliances are attached, a set of zig zag tooth bars parallel with each other and their front and rear ends passing said front and rear bars respectively, pivots connecting each cross bar with each tooth bar at every point of crossing, and teeth carried by each tooth bar.

3. The herein described harrow comprising a pair of cross bars, a pair of links pivotally connected therewith and to which the draft appliances are attached, tooth bars each zig zag in plan view with its front arm crossing the forward cross bar, its rear arm crossing the rearward cross bar and its oblique arm disposed between said bars, pivots between each tooth bar and the cross bars where they cross each other, and teeth carried by said tooth bars.

4. The herein described harrow comprising a pair of cross bars, a pair of links pivotally connected therewith and to which the draft appliances are attached, tooth bars each zig zag in plan view with its front arm crossing the forward cross bar, its rear arm crossing the rearward cross bar and its oblique arm disposed between said bars, pivots between each tooth bar and the cross bars where they cross each other, and teeth carried by said tooth bars, one forward of its front pivot, one rearward of its rear pivot, and others between its two pivots.

5. The herein described harrow comprising a front cross bar of angle iron, a rear cross bar parallel therewith and also of angle iron, means for connecting draft appliances to the front cross bar, a set of metallic tooth bars each of which is zig zag in plan view with its front arm lying below the forward cross bar and its rear arm below the rearward cross bar, pivots loosely connecting each tooth bar with the front and rear cross bars where its arms cross them, and teeth secured to and depending upon the various arms of each tooth bar, one of the teeth being forward of the front cross bar and another rearward of the rear cross bar, for the purpose set forth.

In testimony whereof I have hereunto set my hand in presence of two subscribing witnesses.

CHRISTIAN CHRISTIANSEN.

Witnesses:
W. G. BENNETT,
GEO. W. GRAY.